United States Patent [19]

Lösel et al.

[11] Patent Number: 4,730,125
[45] Date of Patent: Mar. 8, 1988

[54] ARRANGEMENT FOR SYNCHRONIZING THE PULSE-WIDTH-MODULATED CLOCK SIGNALS OF SEVERAL CLOCKED DIRECT VOLTAGE CONVERTERS

[75] Inventors: Walter Lösel, Fürth; Gerd Kohler, Nuremberg, both of Fed. Rep. of Germany

[73] Assignee: U.S. Philips Corporation, New York, N.Y.

[21] Appl. No.: 882,752

[22] Filed: Jul. 7, 1986

[30] Foreign Application Priority Data

Jul. 11, 1985 [DE] Fed. Rep. of Germany ....... 3524768

[51] Int. Cl.$^4$ .......................... H03K 5/13; H03K 1/17
[52] U.S. Cl. .................................. 307/269; 307/527; 328/63; 328/72
[58] Field of Search ....................... 307/265, 480, 527; 331/48; 328/63, 72, 133; 302/527

[56] References Cited

U.S. PATENT DOCUMENTS

| | | | |
|---|---|---|---|
| 3,590,280 | 6/1971 | Hudson | 307/269 |
| 4,525,674 | 6/1985 | Rammiller | 307/269 |
| 4,575,688 | 3/1986 | Whitefoot | 331/48 |

Primary Examiner—Stanley D. Miller
Assistant Examiner—B. P. Davis
Attorney, Agent, or Firm—Robert T. Mayer; Bernard Franzblau

[57] ABSTRACT

An arrangement for synchronizing the PWM clock signals of several clocked direct voltage converters uses commercially available control circuits for controlling the converters. In the case where the TDA 4714 and TDA 4716 units are used as the control circuits no connection for synchronizing the switching clock signals is provided. The arrangement guarantees the synchronism of the oscillators of all the control circuits and features apparatus by which the phase shift between two switching clocks of two arbitrary direct voltage converters can be chosen to amount to 0° or 180°.

9 Claims, 4 Drawing Figures

ARRANGEMENT FOR SYNCHRONIZING THE PULSE-WIDTH-MODULATED CLOCK SIGNALS OF SEVERAL CLOCKED DIRECT VOLTAGE CONVERTERS

BACKGROUND OF THE INVENTION

This invention relates to an arrangement for synchronizing the PWM-clock signals of several clocked direct voltage converters, which each comprise a control circuit having an individual oscillator, while each control circuit has a first connection for a capacitor and a second connection for a resistor for defining the frequency of the oscillator, the PWM-clock signal for driving the switching transistor being applied to a third connection and a pulse shifted in phase by 180° with respect to the PWM-clock signal being applied to a fourth connection.

A circuit arrangement for synchronizing PWM-clock signals of several clocked direct voltage converters is known from DE-OS No. 3223179. In the known arrangement, the unit supplying a PWM-clock signal can be driven from the outside by a clock signal having a suitable frequency and a clock ratio of ½. The synchronization of the PWM-clock signals of several clocked direct voltage converters is therefore effected according to DE-OS No. 3223179 in a manner such that all of the direct voltage converters are supplied with the clock signal of the same clock generator. Since all the direct voltage converters are connected to the same primary voltage source—hereinafter this case is always assumed—, the synchronization of all the direct voltage converters leads in the manner described to high peak loads of the primary voltage source, for example during the first half cycle of the clock signal. In order to reduce the peak load, according to DE-OS No. 3223179 a part of all the direct voltage converters is supplied with the direct clock signal and another part is supplied with the inverted clock signal of the clock generator. Thus, the load on the primary voltage source is distributed substantially uniformly over the two half cycles of the clock signal. The PWM-clock signals thus synchronized of two arbitrary direct voltage converters then have either no phase shift (time shift) or a phase shift of 180° with respect to each other.

When the individual direct voltage converters are equipped with commercially available driving elements—designated hereinafter as control circuits—, (more particularly the elements TDA 4714 and TDA 4716 are considered), problems arise because of the specific construction of these control circuits if several direct voltage converters are to be synchronized with a phase shift of 0° or 180° at choice.

The control circuits have two connections, one of which has to be provided with a resistor, while the other has to be provided with a capacitor, in order to define the frequency of the internal oscillator of the control circuit. If each control circuit was designed so that they all operate at the same nominal frequency, because of the mutually independent operations of the control circuits and of the direct voltage converters, the problem of the high peak load would be solved, it is true, but because of the inevitable deviations from the nominal frequency, modulation products would be formed, which would propagate over the lead to the primary voltage source and would disturb other loads connected to the primary voltage source. These modulation products would have to be suppressed by means of complicated filtering elements. Finally, it should be noted that the manufacturers of the control circuits indicated above have not provided any possibility for the synchronization of several control circuits.

SUMMARY OF THE INVENTION

Therefore, an object of the invention has for its object to provide an arrangement for synchronizing the PWM-clock signals of several direct voltage converters which are equipped with the control circuits characterized more fully hereinbefore and in which the phase shift between two arbitrary switching clocks can amount to 0° and 180° at choice:

This object is achieved in that the first connections of the control circuits of all the direct voltage converters are connected to a common capacitor and the second connections are provided with individual resistors; in that the PWM-clock signal and the pulse of a first control circuit shifted in phase by 180° are each time supplied to an input of a logic circuit; in that the unmodulated switching clock with the duty cycle ½ is obtained by means of a succeeding first flip-flop; in that for each further control circuit a decision circuit is provided having three inputs and one output; in that an output of the first flip-flop is connected to the first input of the decision circuit and the third and fourth connections are connected to the two remaining inputs of the associated decision circuit, and in that the decision circuit passes that pulse from the third or fourth connection of the control circuit on to its output, at which the transient times for the associated switching transistor fall within a predetermined half cycle of the switching clock of the first control circuit.

BRIEF DESCRIPTION OF THE DRAWING

Advantageous embodiments of the invention are set out in the dependent claims. A preferred embodiment of the invention will be described more fully with reference to the drawing in which:

DESCRIPTION OF THE PREFERRED EMBODIMENTS

Figure 1:
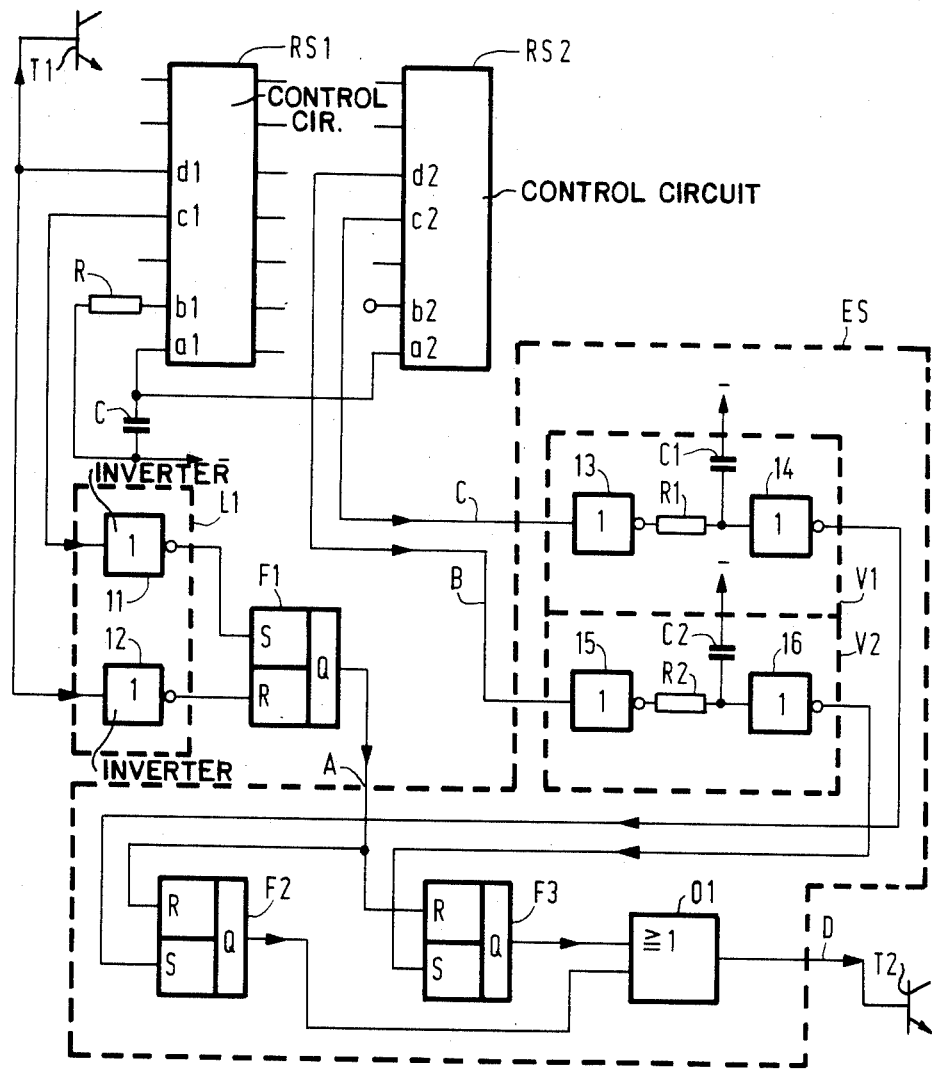
FIG. 1 shows a circuit diagram of the preferred embodiment.

In the embodiment shown in FIG. 1, the switching clocks of two direct voltage converters are synchronized with each other. FIG. 1 only shows the component parts of the two direct voltage converters essential to the invention. RS1 and RS2 are the control circuits of the direct voltage converters; a1, b1, c1 and d1 are the connections essential to the invention of the control circuit RS1 and a2, b2, c2 and d2 designate the corresponding connections of the control circuit RS2. If control circuits RS1 and RS2 are TDA 4716 units, they each have an internal VCO (not shown) connected to the terminals a1, b1 and a2, b2, respectively. The connections a1 and a2, which have to be provided with capacitive means in the case of individual frequency adjustment, are connected to each other. Additionally, a capacitor C is arranged between the connection a1 and the negative terminal of a supply voltage source.

The connection b1, which has to be provided with a resistor in the case of individual frequency adjustment, is also connected through a resistor R to the negative terminal of the supply voltage source, while the corresponding connection b2 of the control circuit RS2 remains unconnected, i.e. it is effectively connected to a resistor of infinite resistance By these measures, the synchronism of the internal oscillators is ensured. Their frequency is defined by the values of the resistor R and of the capacitance C. If the connection b2 is provided with a finite resistor, the same effect would be obtained as if this resistor was connected parallel to the resistor R.

The synchronism of the internal oscillators does not guarantee, however, the phase equality of the pulses that can be used as switching clocks, which are developed at the corresponding connections d1, d2 and c1, c2, respectively, of the control circuits RS1 and RS2, respectively. It rather depends upon chance whether, for example, the pulses at the connections d1 and d2 have the phase shift 0° or 180°. The following description explains the measures which also guarantee a defined phase shift.

Figure 2:
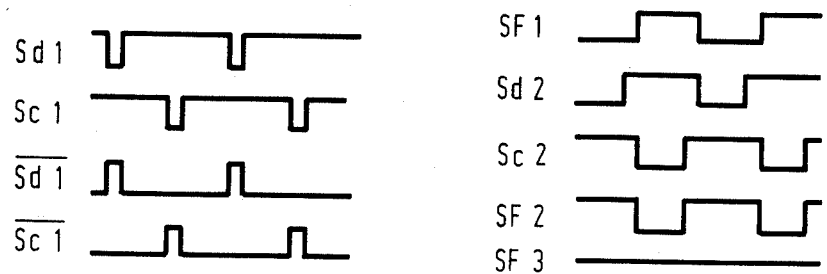
FIG. 2 shows pulse time diagrams useful in explaining the operation.
Figure 3:
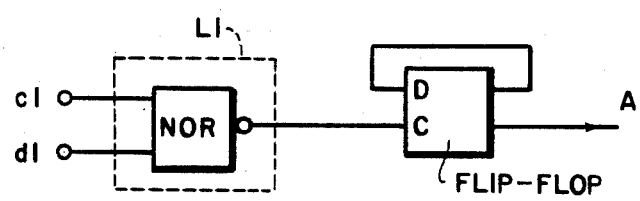
FIG. 3 shows a modification of the logic circuit L1 of FIG. 1.
Figure 4:
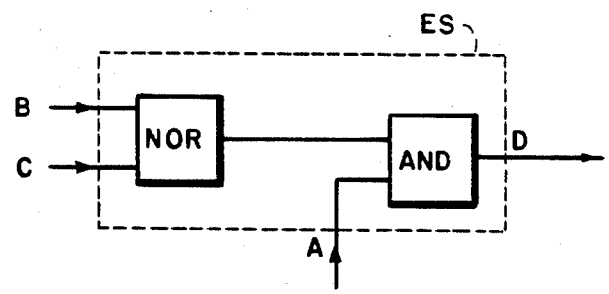
FIG. 4 shows a modification of the decision circuit ES of the circuit the circuit shown in FIG. 1.

The clock signal modulated in pulse width applied to the connection c1 is shifted in phase by 180° with respect to the pulse applied to the connection d1 and the same applies to the connections d2 and c2. In the control circuit RS1, the pulse applied to the connection d1 is used as a PWM-clocksignal and is supplied to the transistor T1. The switching clock Sd1, of which FIG. 2 shows pulses produced in a given time interval, is now used as a reference clock. The control circuit RS1 can therefore be designated as master and the control circuit RS2 can be designated as slave. The pulse occuring at the connection c1 is designated in FIG. 2 by SC1. The same time interval as for the switching clock Sd1 is shown. The corresponding signals of the control circuit RS2 are designated in FIG. 2 by Sd2 and Sc2, respectively.

The information about the transient times of the associated switching transistors $T_1$ and $T_2$ of respective clocked direct voltage converters (not shown) are contained with the pulses Sd1, Sc1, Sd2 and Sc2 in their states having the binary value zero.

By means of a logic circuit L1 comprising two inverters I1 and I2, the pulses Sd1 and Sc1 are first inverted and are then supplied as signals $\overline{Sd1}$ and $\overline{Sc1}$ to the R and S inputs, respectively, of a flipflop F1. A signal SF1 appears at the Q output of the flipflop F1, which signal represents—as appears from FIG. 2—the unmodulated switching clock with the duty cycle ½. The signal SF1 is supplied to the input A of a decision circuit ES. Via two further inputs B and C, the decision circuit ES also receives the signals Sd2 and Sc2. Of these two signals, the decision circuit ES passes that signal to its output D, and hence to the switching transistor T2, which assumes the binary value zero in the half cycle in which the unmodulated switching clock SF1 assumes the binary value one.

This effect is attained by two asynchronous R-S flipflops F2 and F3, whose R inputs are connected to the Q output of the flipflop F1. The signal Sc2, delayed by a delaying member V1, is supplied to the S input of the flipflop F2 and the signal Sd2, delayed by the delaying member V2, is supplied to the S input of the asynchronous flipflop F3. The delay by the delaying members V1, V2 is necessary in order that the asynchronous flipflops F2, F3 assume states defined with certainty.

The signal SF2 is developed at the Q output of the asynchronous flipflop F2 and the signal SF3 is developed at the Q output of the asynchronous flipflop F3. An OR gate 01 combines the two signals and passes the combination on to the transistor T2 of the second direct voltage converter.

A comparison of the signals Sd1, SF1 and SF2—the latter signal is also the signal at the output D—shows that in the present example the phase shift between the switching clocks of the first and second converters is 180°. If a phase shift of 0° should be attained, solely the Q output of the flipflop F1 has to be connected to the R inputs of the asynchronous flipflops F2 and F3.

The delaying members V1 and V2 each comprise a preceding inverter 13 and 15, respectively, an R-C delaying member R1, C1 and R2, C2 respectively, and a succeeding inverter 14 and 16, respectively.

What is claimed is:

1. An arrangement for synchronizing PWM clock signals of several clocked direct voltage converters each of which comprises a control circuit having an individual oscillator, each control circuit having a first connection for a capacitor and a second connection for a resistor for defining the frequency of the control circuit oscillator, the PWM clock signal for driving a switching transistor in a clocked converter being derived at a third connection of the control circuit and a pulse shifted in phase by 180° with respect to the PWM clock signal being derived at a fourth connection of the control circuit, said arrangement comprising, means coupling the first connections of the control circuits of all the direct voltage converters to a common capacitor and the second connections to individual resistors, means coupling the PWM clock signal and the pulse shifted in phase by 180° of a first control circuit to an input means of a logic circuit, a first flipflop responsive to an output of the logic circuit for deriving a signal having a duty cycle of 50%, wherein for each further control circuit there is a decision circuit having three inputs and an output, means connecting an output of the first flipflop to a first input and the third and fourth connections of the further control circuit to second and third inputs of the associated decision circuit, and wherein the decision circuit passes that pulse from the third or fourth connection of the further control circuit to its output, in which the transient times for the associated switching transistor fall within a predetermined half cycle of the switching clock of the first control circuit.

2. An arrangement as claimed in claim 1, characterized in that the logic circuit comprises two inverters, and in that an output of the first inverter is connected to an R input and an output of the second inverter is connected to an S input of the first flipflop.

3. An arrangement as claimed in claim 1, characterized in that the logic circuit comprises a NOR gate, whose output is connected to the clock input of a D flipflop which is fed back.

4. An arrangement as claimed in claim 1, characterized in that the decision circuit comprises first and second asynchronous flipflops, an OR gate and first and second delay members; in that the first input of the decision circuit is connected to interconnected R inputs of the first and second asynchronous flipflops; in that the second and third inputs of the decision circuit are coupled to a respective connection of a respective delay member; in that a second connection of one delay member is connected to an S input of the first asynchronous flipflop and a second connection of the second delay member is connected to an S input of the second asynchronous flipflop; in that inputs of the OR gate are connected to respective outputs of the asynchronous flipflops, and in that the output of the decision circuit is connected to the output of the OR gate.

5. An arrangement as claimed in claim 1, characterized in that the decision circuit comprises a NOR gate and an AND gate; in that an output of the NOR gate is connected to a first input of the AND gate; in that the first input of the decision circuit is connected to the second input of the AND gate; in that the second and third inputs of the decision circuit are connected to first and second inputs, respectively, of the NOR gate, and in that the decision circuit output is constituted by an output of the AND gate.

6. An apparatus for synchronizing PWM clock signals for at least two clocked direct voltage converters, each converter including an associated control circuit with each control circuit having an individual oscillator, each control circuit having first and second terminals for connection to a capacitor and a resistor, respectively, which together define the oscillator frequency, each control circuit having third and fourth terminals which produce a PWM clock signal and a pulse signal 180° out of phase with the PWM clock signal, respectively, said apparatus comprising: means for supplying the PWM clock signal at said third terminal of a first control circuit to a switching transistor of a first one of said converters, a capacitor connected in common to the first terminals of all said control circuits, individual resistors connected to the second terminals of respective control circuits, means coupling the PWM clock signal and the pulse signal of the first control circuit to first and second inputs, respectively, of a logic circuit, a first flipflop having input means coupled to output means of the logic circuit and an output which supplies a signal having a duty cycle of 50%, a decision circuit having first, second and third inputs and an output, means coupling the output of the first flipflop to the first input of the decision circuit, means coupling the third and fourth terminals of a second control circuit associated with a second one of the converters to the second and third inputs, respectively, of the decision circuit, said decision circuit including means responsive to signals at its first, second and third inputs for deriving at its output a second PWM clock signal for a switching transistor of said second converter which second clock signal has a 0° or 180° phase shift relative to the PWM clock signal supplied to the switching transistor of said first converter.

7. An apparatus as claimed in claim 6 wherein the logic circuit comprises first and second inverters connected respectively between the third and fourth terminals of the first control circuit and reset and set inputs of the first flipflop.

8. An apparatus as claimed in claim 6 wherein said deriving means of the decision circuit comprises: first and second asynchronous flipflops each having a set and reset input and with the reset inputs each connected to said first input of the decision circuit, first and second delay elements coupled between the second and third inputs of the decision circuit and the set inputs of said first and second asynchronous flipflops, respectively, and an OR gate connected between outputs of said first and second asynchronous flipflops and said output of the decision circuit.

9. An apparatus as claimed in claim 6 wherein the deriving means of the decision circuit comprises: a NOR gate having first and second inputs connected to the second and third inputs of the decision circuit, and an AND gate having a first input connected to said first input of the decision circuit, a second input connected to an output of the NOR gate, and an output coupled to said output of the decision circuit.

* * * * *